Dec. 11, 1928.
J. H. RICHARDS
1,694,670
ENGINE TROUBLE DIAGNOSER
Filed April 29, 1926
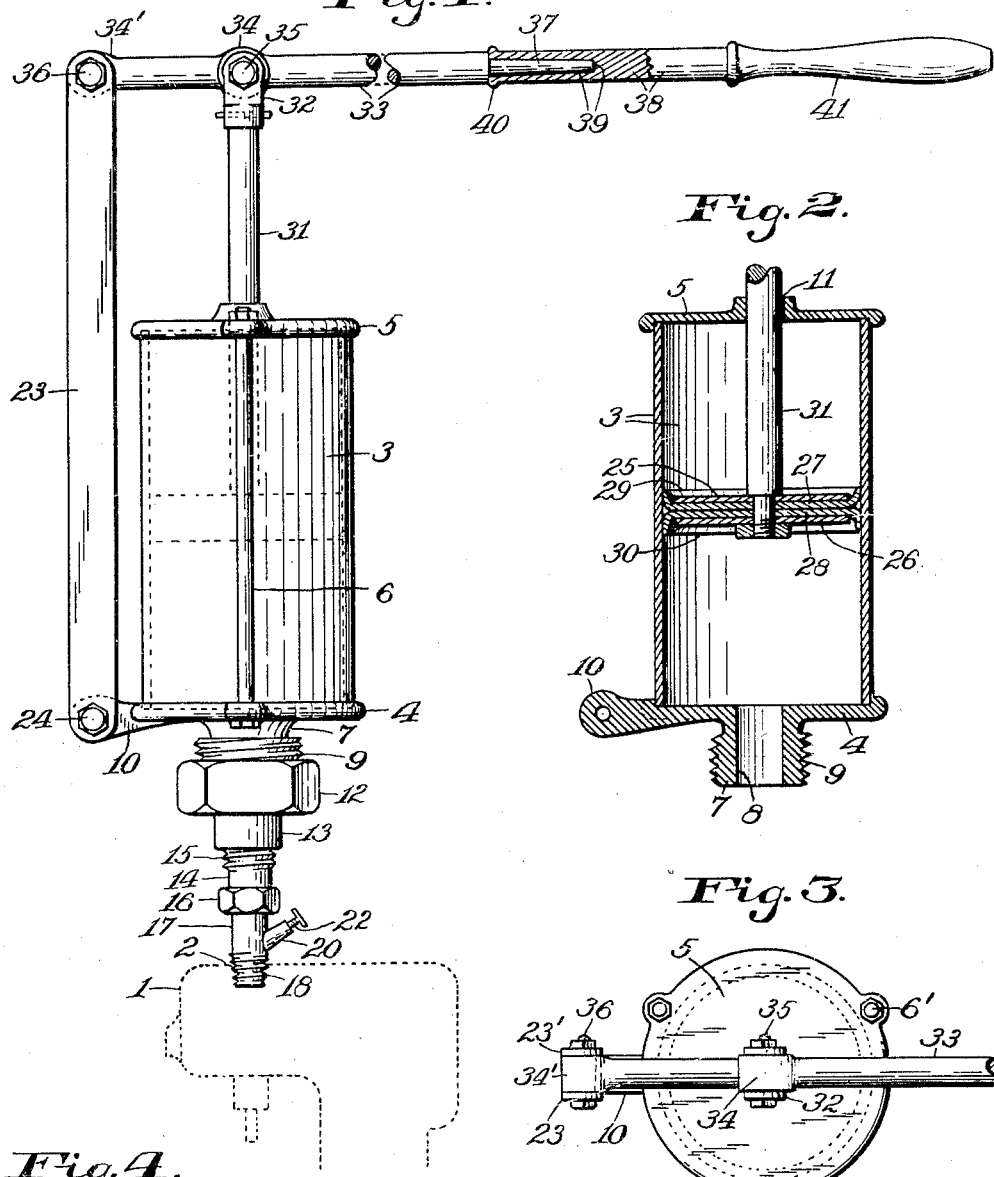
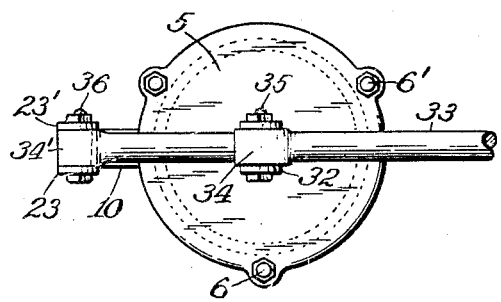
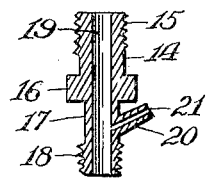
INVENTOR:
James H. Richards,
BY E. T. Silvius,
ATTORNEY.

Patented Dec. 11, 1928.

1,694,670

UNITED STATES PATENT OFFICE.

JAMES HENRY RICHARDS, OF GLENDALE, CALIFORNIA.

ENGINE-TROUBLE DIAGNOSER.

Application filed April 29, 1926. Serial No. 105,513.

This invention relates to an instrument that is designed to be used for testing internal combustion engines or diagnosing engine trouble in order to determine what parts may need adjustments or repairs, the invention having reference more particular to a pneumatic instrument that is designed particularly for use in garages or repair shops.

An object of the invention is to provide an engine trouble diagnoser which shall be so constructed as to enable a person to locate various sources of trouble in engines, without it being necessary to disassemble an engine in order to find the source of trouble.

Another object is to provide a reliable instrument, which shall not be costly and which shall be adapted to be readily applied and conveniently used, to determine the sources of noises which indicate looseness of machinery parts due to wear or need of readjustment, so that one may learn whether or not repairs or adjustments are urgent to avoid possibly serious consequencies or delay.

A further object is to provide an instrument for the above-mentioned purposes which may be so constructed as to be suitable as a convenient part of a repair outfit to be conveniently packed in small compass for convenient carrying from place to place, and which shall be adapted to be reliable, durable and economical in use.

With the above-mentioned and other objects in view, the invention consists in a pneumatic instrument having means to cause suction and compression of air alternately to disturb or agitate machinery parts, so as to cause noises which would enable an observer to determine the point at which a noise may be caused in operation as a result of a machinery fault; and the invention consists also further in the parts and combinations and arrangements of parts as hereinafter particularly described and definitely claimed.

Referring to the drawings,—Figure 1 is a side elevation of the diagnoser in which portions are broken away; Fig. 2 is a central section showing vital parts of the instrument; Fig. 3 is a top plan of the instrument, a portion of its operating lever being broken away; and Fig. 4 is a longitudinal central section of a novel adapter comprised in the invention.

Similar reference characters in the different figures of the drawings indicate corresponding elements or features of construction herein referred to in detail.

In the drawings the numeral 1 indicates generally an internal combustion engine or particularly that part to which a spark plug may be connected in common practice, being indicated by dotted lines, to illustrate the relative arrangement of the diagnoser in practical use, the numeral 2 indicating the usual screw-threaded hole for the spark plug The instrument comprises a hollow cylinder 3 provided with a bottom head 4 and a top head 5, the heads being secured to the cylinder preferably by means of bolts 6, 6', the bottom head 4 being adapted to constitute a supporting base which includes a neck 7 having a large duct 8 therein, the neck having external screw-threads 9 of suitable size to conform to the requirements of a pipe-union fitting. The base 4 has a lateral arm 10 thereon which preferably is cast integral therewith. The top head 5 has a central guide bore 11 for a piston rod.

A pipe-union nut 12 is connected with the neck 7 whereby a suitable union part 13 is detachably secured to the neck, the part 13 being of suitable diameter, in some cases sufficiently large to receive a nipple corresponding in diameter to that of the larger size of spark plug hole 2, in other cases being constructed as a reduction part to receive a smaller nipple corresponding to the size of the smaller spark plug hole, various sizes of spark plugs commonly being used. Preferably the union part 13, which is flanged in the nut, is of large diameter and an improved adapter is provided which comprises a main portion 14 having external screw-threads 15 which is connected to the part 13, the middle portion of the adapter having a nut form 16 thereon to which a wrench may be applied and from which extends a shank or plug portion 17 of suitable diameter, either a larger or smaller to correspond to the spark plug hole found in the engine and provided with suitable external screw-threads 18 to secure the adapter to the engine, the adapter having a longitudinal duct 19 extending therethrough. The adapter has a lateral nipple 20 thereon which has a duct 21 therein provided with a removable plug 22 which when removed affords a connection with which a stethoscope may be applied in a convenient and effective manner. Other adapters may have plug portions of relatively larger diameter, and the outfit usually includes well-known pipe nipples and elbows to be connected with the adapter shank and the engine, as may be needed to set the cylinder 3 at a convenient point away from the engine as may be desired or required to avoid interference with parts of the engine structure.

A fulcrum post is provided on the arm 10 and preferably comprises two flat link bars 23 and 23' connected by means of a pivot bolt 24 to the arm 10, being of suitable length to extend upward beyond the top head of the cylinder.

A piston is provided to operate in the cylinder 3 and preferably comprises two metal plates 25 and 26 spaced apart and two leather disks 27 and 28 arranged between the plates and all secured together, one of the leather disks having a cup flange 29 extending towards one of the cylinder heads and the other having a reversely arranged cup flange 30 extending towards the opposite cylinder head, the piston therefore being double acting and is secured to a piston rod 31 that extends through the guide bore 11, being slightly loose to permit passage of air though the top head 5 without the necessity of a separate vent hole. The end of the piston rod is provided with a jaw 32 which preferably is detachable from the rod. A sectional operating lever is provided which comprises a main part 33 having a boss 34 at a suitable distance from one end thereof, the boss being connected to the jaw 32 by means of a pivot bolt 35, and the end of the lever part has a boss 34' which is connected to the link bars by means of a pivot bolt 36. The opposite end of the main part 33 has a tapered shank 37 thereon. The lever has also a leverage part 38 which has a tapered socket 39 therein removably receiving the shank 37, and the leverage part preferably has a bead 40 on one end against which to hammer to dislodge the leverage part from the shank 37, the opposite end of the leverage part having a handle 41 thereon.

The instrument is especially useful for locating loose bearings, leaky piston rings and piston "slap", leaky valves, and is useful in locating other unusual motor noises, as those involving valve tappets, loose timer chains, or other noises indicating abnormal conditions.

In practical use, to test for leaky valves while the engine or motor is not running, bring the engine piston so that it is about the upper end of the compression stroke, remove the spark plug and screw the diagnoser connection into the spark plug hole, using suitable connections furnished with each diagnoser as part of a kit, push down on the operating lever of the diagnoser, and if valves are leaking air will be heard escaping past the valves. To test for piston leaks proceed as before and if leaking, air will be heard escaping past the piston; a stethoscope placed over a "breather" pipe or other suitable vent to crank case will in case of slight leaks aid in determining this.

To locate bearing noises proceed as before but operate the diagnoser lever rapidly up and down; the piston pin if loose will cause a tapping noise, if a connecting rod bearing is loose a hammering noise will occur, if a main bearing be loose a dull thud will be made, if piston rings are loose in their grooves a clicking noise will be made. These sounds are distinctively different and unmistakable. To test for piston slap turn the motor until the piston to be tested is about half way up on the compression stroke, work the diagnoser, and if the piston is loose it will be heard to hammer on the cylinder wall. When using the diagnoser and both intake and exhaust valves are leaking or if piston is leaking they can be sealed while making the test by removing the closure from the stethoscope connection and applying a little heavy cylinder oil over the valves or piston through the connection nipple 20 as may be found necessary.

When the instrument is operated the piston in the cylinder 3 on its upward stroke causes vacuum in the upper chamber of the engine cylinder above the piston therein, and this tends to pull up the piston, and upon downward stroke of the diagnoser piston compression of air results in the chamber and tends to force down the engine piston with consequent noises due to looseness of parts related to the engine piston.

What is claimed as new is:

1. In an instrument of the character described, the combination of a hollow cylinder, a bottom head and a top head detachably secured to the cylinder, the bottom head having a lateral fulcrum arm and also a neck integral therewith, the neck and head having an unobstructed duct therethrough and the neck being externally screw-threaded for a pipe-union nut, a pair of link bars pivoted to said arm, a double-action piston in the cylinder, a solid piston rod secured to the piston and guided in said top head, and a sectional lever pivotally connected with the piston rod and also with the link bars.

2. In an instrument for locating sounds of loose parts in internal combustion engines, the combination of a hollow cylinder provided with a bottom head having a screw-threaded neck and also a lateral fulcrum arm integral therewith, the head and neck having an unobstructed duct therethrough, a pipe-union part having a nut screwed onto said neck, a stethoscope-holding adapter connected to said part and having a shank screw-threaded for the spark plug hole of the engine, a double-action cup piston in the cylinder, a solid piston rod secured to the piston and having a jaw thereon, and a lever composed of detachable sections, one of said sections being pivoted to said jaw and fulcrumed on said arm.

3. A portable knock-down instrument comprising a hollow cylinder, a bottom head on one end of the cylinder with a hollow threaded neck thereon, a top head on the opposite end of the cylinder with a guide bore therein, a plurality of bolts arranged outside the cylinder, each bolt being connected with both of said heads to detachably secure the heads to the cylinder, a flexibly packed piston arranged in the cylinder, a solid piston rod secured to the piston and loosely guided in said bore, and a sectional knock-down lever connected with the piston rod and provided with a supporting post having a fulcrum connection with the bottom head, the lever being extremely long relatively to the piston area.

In testimony whereof, I affix my signature on the 21st day of April, 1926.

JAMES HENRY RICHARDS.